United States Patent
Park et al.

(10) Patent No.: US 11,791,881 B2
(45) Date of Patent: Oct. 17, 2023

(54) RANDOM ACCESS METHOD AND APPARATUS USING SUPERPOSED PREAMBLES

(71) Applicant: Electronics and Telecommunications Research Institute

(72) Inventors: Gi Yoon Park, Daejeon (KR); Seok Ki Kim, Daejeon (KR); Ok Sun Park, Daejeon (KR); Eun Jeong Shin, Daejeon (KR); Jae Sheung Shin, Daejeon (KR); Jin Ho Choi, Melbourne (AU)

(73) Assignee: Electronics and Telecommunications Research Institute, Daejeon (KR)

( * ) Notice: Subject to any disclaimer, the term of this patent is extended or adjusted under 35 U.S.C. 154(b) by 63 days.

(21) Appl. No.: 17/405,133

(22) Filed: Aug. 18, 2021

(65) Prior Publication Data
US 2022/0094413 A1  Mar. 24, 2022

(30) Foreign Application Priority Data

Sep. 23, 2020 (KR) .................. 10-2020-0123097
Jul. 20, 2021 (KR) .................. 10-2021-0095021

(51) Int. Cl.
*H04B 7/06* (2006.01)
*H04W 74/08* (2009.01)
*H04W 74/00* (2009.01)

(52) U.S. Cl.
CPC ........ *H04B 7/0634* (2013.01); *H04W 74/008* (2013.01); *H04W 74/0841* (2013.01)

(58) Field of Classification Search
CPC .............. H04B 7/0634; H04W 74/008; H04W 74/0841; H04W 74/0833; H04L 5/0048
See application file for complete search history.

(56) References Cited

U.S. PATENT DOCUMENTS

| | | | |
|---|---|---|---|
| 10,425,973 B2 | 9/2019 | Patel et al. | |
| 10,567,033 B2 | 2/2020 | Kang et al. | |
| 2009/0110033 A1* | 4/2009 | Shattil | H04L 27/2697 375/147 |
| 2015/0146631 A1 | 5/2015 | Kim et al. | |
| 2019/0059112 A1 | 2/2019 | Ou et al. | |
| 2019/0150199 A1 | 5/2019 | Cho et al. | |
| 2020/0015285 A1 | 1/2020 | Shin et al. | |
| 2020/0099439 A1* | 3/2020 | Mundarath | H04B 7/088 |
| 2020/0214044 A1* | 7/2020 | Qian | H04W 52/50 |
| 2020/0280385 A1 | 9/2020 | Kwon et al. | |
| 2021/0014694 A1 | 1/2021 | Li et al. | |
| 2021/0112600 A1* | 4/2021 | Lei | H04L 5/0091 |

OTHER PUBLICATIONS

"NR PRACH design", *3GPP TSG-RAN WG1 Meeting #89*, Hangzhou, People's Republic of China, May 15-19, 2017 (pp. 1-13).

* cited by examiner

*Primary Examiner* — Kibrom T Hailu
*Assistant Examiner* — Nizam U Ahmed
(74) *Attorney, Agent, or Firm* — NSIP Law

(57) ABSTRACT

An operation method of a terminal in a communication system may comprise: receiving, from a base station, basis preamble information and linear combination information; generating a superposed preamble by using the basis preamble information and the linear combination information; transmitting, to the base station, a first message including the generated superposed preamble; and receiving, from the base station, a second message that is a response signal for the first message.

16 Claims, 8 Drawing Sheets

RANDOM ACCESS METHOD AND APPARATUS USING SUPERPOSED PREAMBLES

CROSS-REFERENCE TO RELATED APPLICATIONS

This application claims priority to Korean Patent Applications No. 10-2020-0123097 filed on Sep. 23, 2020 and No. 10-2021-0095021 filed on Jul. 20, 2021 with the Korean Intellectual Property Office (KIPO), the entire contents of which are hereby incorporated by reference.

BACKGROUND

1. Technical Field

The present disclosure relates to a random access technique, and more particularly, to a random access technique using superposed preambles, which mitigates reception complexity while securing a large number of preambles.

2. Related Art

With the development of information and communication technology, various wireless communication technologies have been developed. As a representative wireless communication technology, there may be long term evolution (LTE), new radio (NR), or the like defined as the 3rd generation partnership project (3GPP) specification. The LTE may be one of 4th generation (4G) wireless communication technologies, and the NR may be one of $5^{th}$ generation (5G) wireless communication technologies.

Meanwhile, in the mobile communication technologies, a terminal may randomly select a preamble to attempt random access to a base station. In such a random access procedure, the number of preambles may not be sufficiently large compared to the number of terminals. Accordingly, multiple terminals may attempt to access the base station using the same single preamble, and in this case, a collision may occur and the accesses may fail. As such, when a terminal fails to access the base station, it may attempt the access again, and accordingly, an access delay time becomes long, which may cause a problem in reliability of the communication network. In particular, a machine type communications (MTC) environment, compared to a human type communications (HTC) environment, there may be significantly more terminals attempting to access, so that an access delay of the terminal may worsen. Accordingly, the mobile communication system may need to secure a large number of preambles. However, if the mobile communication system increases the number of preambles, cross-correlation between the preambles may increase, a possibility of a missed detection in the communication network may increase, and a difficulty of calculating the cross-correlation may also increase.

SUMMARY

Accordingly, exemplary embodiments of the present disclosure are directed to providing a method and an apparatus for random access using superposed preambles, which mitigate reception complexity while securing a large number of preambles.

According to a first exemplary embodiment of the present disclosure, an operation method of a terminal in a communication system may comprise: receiving, from a base station, basis preamble information and linear combination information; generating a superposed preamble by using the basis preamble information and the linear combination information; transmitting, to the base station, a first message including the generated superposed preamble; and receiving, from the base station, a second message that is a response signal for the first message.

The generating of the superposed preamble may comprise: generating a basis preamble matrix by using basis preambles indicated by the basis preamble information; selecting one linear combination from linear combinations indicated by the linear combination information; and generating the superposed preamble by applying the selected linear combination to the basis preamble matrix.

The generating of the superposed preamble by applying the selected linear combination to the basis preamble matrix may comprise: selecting one row vector from the basis preamble matrix; and generating the superposed preamble by multiplying the selected one row vector by the selected linear combination.

The superposed preamble may be generated as a linear combination of at least one basis preamble indicated by the basis preamble information, and the superposed preamble may be calculated by an inner product of correlation vectors of a linear combination matrix composed of linear combinations indicated by the linear combination information.

The first message may further include a data packet, and in the transmitting of the first message, the terminal may transmit the first message including the superposed preamble and the data packet to the base station.

The first message may be a MsgA, and the second message may be a MsgB.

According to a second exemplary embodiment of the present disclosure, an operation method of a base station in a communication system may comprise: transmitting, to terminals, basis preamble information and linear combination information; receiving, from the terminals, first messages including superposed preambles generated using the basis preamble information and the linear combination information; detecting the superposed preambles by calculating correlations between the first messages and basis preambles indicated by the basis preamble information; and transmitting, to the terminals, second messages that are response signals for the first messages.

The superposed preamble may be configured as a linear combination of at least one basis preamble indicated by the basis preamble information, the linear combination being one of linear combinations indicated by the linear combination information.

The detecting of the superposed preambles may comprise: calculating correlations between the first messages and the basis preambles; and detecting the superposed preambles by estimating first radio channel states by using the correlations.

In the calculating of the correlations between the first messages and the basis preambles, the correlations between the first messages and the basis preambles may be calculated by multiplying a basis preamble matrix composed of the basis preambles indicated by the basis preamble information to a reception signal matrix of the first messages.

The detecting of the superposed preambles by estimating first radio channel states by using the correlations may comprise: defining virtual channel vectors by using radio channel vectors and average reception power; defining state channel vectors by using the virtual channel vectors and a linear combination matrix; calculating estimated values of the state channel vectors by using the correlations; calculating the virtual channel vectors by using the estimated values of the state channel vectors; calculating first radio channel vectors by estimating first radio channel states using the virtual channel vectors; and detecting the superposed preambles by performing an inner product of the first radio channel vectors.

The operation method may further comprise: estimating second radio channel states corresponding to the detected superposed preambles; and detecting a data packet in each of the first messages by using the estimated second radio channel states, wherein each of the first message includes a data packet.

According to a third exemplary embodiment of the present disclosure, a terminal in a communication system may comprise: a processor; a memory electronically communicating with the processor; and instructions stored in the memory, wherein when executed by the processor, the instructions may cause the terminal to: receive, from a base station, basis preamble information and linear combination information; generate a superposed preamble by using the basis preamble information and the linear combination information; transmit, to the base station, a first message including the generated superposed preamble; and receive, from the base station, a second message that is a response signal for the first message.

In the generating of the superposed preamble, the instructions may further cause the terminal to: generate a basis preamble matrix by using basis preambles indicated by the basis preamble information; select one linear combination from linear combinations indicated by the linear combination information; and generate the superposed preamble by applying the selected linear combination to the basis preamble matrix.

In the generating of the superposed preamble by applying the selected linear combination to the basis preamble matrix, the instructions may further cause the terminal to: select one row vector from the basis preamble matrix; and generate the superposed preamble by multiplying the selected one row vector by the selected linear combination.

The superposed preamble may be generated as a linear combination of at least one basis preamble indicated by the basis preamble information, and the superposed preamble may be calculated by an inner product of correlation vectors of a linear combination matrix composed of linear combinations indicated by the linear combination information.

The first message may further include a data packet, and in the transmitting of the first message, the instructions may further cause the terminal to transmit the first message including the superposed preamble and the data packet to the base station.

According to the exemplary embodiments of the present invention, the terminal may transmit a superposed preamble generated by applying a linear combination to basis preambles to the base station, and the base station may detect the superposed preamble by calculating a correlation of basis preambles for a received signal. In addition, according to the exemplary embodiments of the present disclosure, the number of preambles may increase as superposed preambles are generated by applying a linear combination to basis preambles. In addition, according to the exemplary embodiments of the present disclosure, the superposed preamble may be detected by performing correlation calculation using basis preambles, so that there may be a gain in terms of reception complexity. In addition, according to the exemplary embodiments of the present disclosure, the superposed preamble may be detected by calculating an inner product of a correlation vector pair corresponding to non-zero elements in each row of a linear combination matrix composed of linear combinations, so that the amount of computation can be remarkably reduced as the number of non-zero elements in the respective rows is increased.

DETAILED DESCRIPTION OF THE EMBODIMENTS

Figure 1:
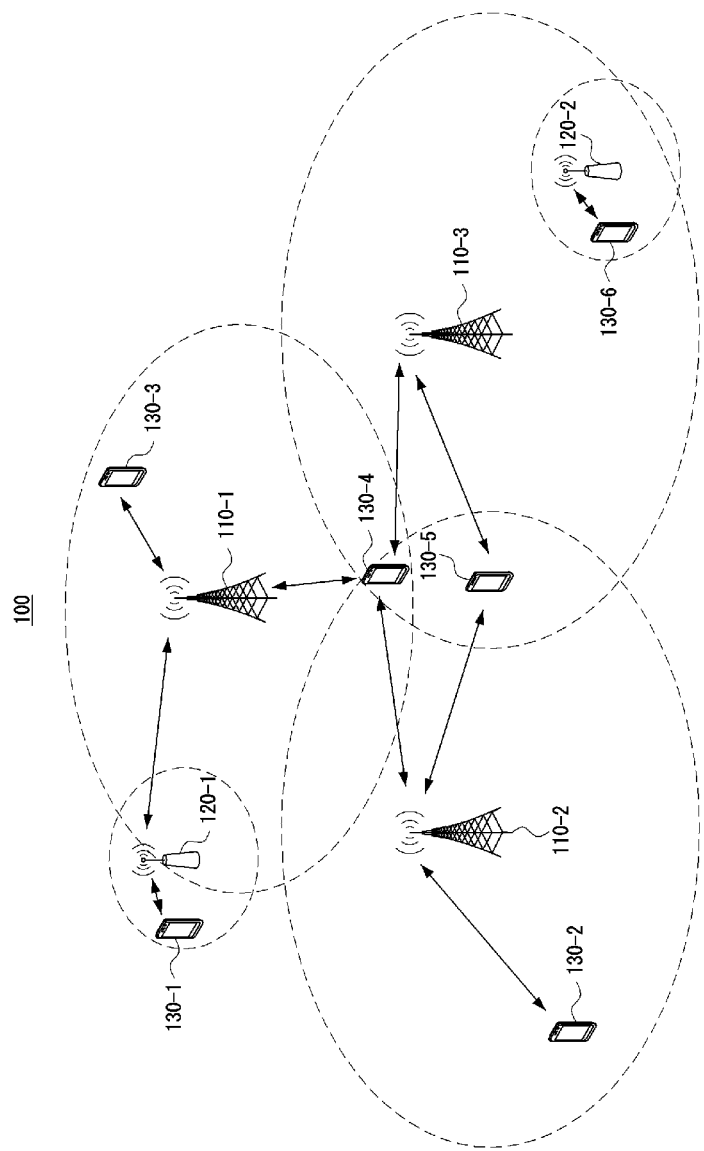
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support at least one communication protocol. For example, each of the plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
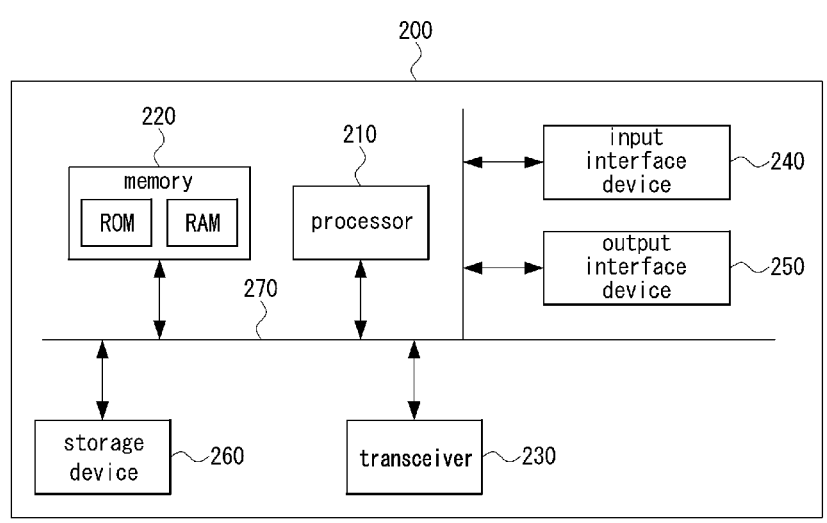
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270. However, each of the components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring back to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), etc.) defined in the 3rd generation partnership project (3GPP) specification. Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner. Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Figure 3:
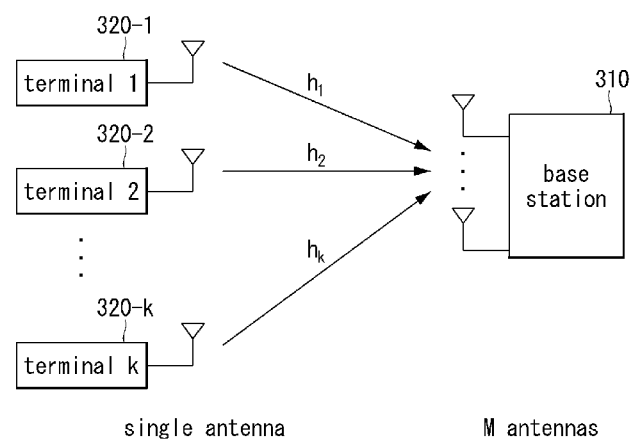
FIG. 3 is a conceptual diagram illustrating a second exemplary embodiment of a communication system.

FIG. 3 is a conceptual diagram illustrating a second exemplary embodiment of a communication system.

Referring to FIG. 3, in a communication system, a base station 310 may have M receive antennas, and each of terminals 320-1 to 320-$k$ may have one transmit antenna. The K terminals 320-1 to 320-$k$ may transmit a preamble and data to the base station 310 in synchronization. Here, K may be equal to or smaller than M. K and M may be natural numbers.

Figure 4:
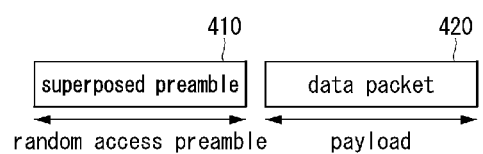
FIG. 4 is a structural diagram illustrating a first exemplary embodiment of a MsgA transmitted in a random access procedure.

FIG. 4 is a structural diagram illustrating a first exemplary embodiment of a MsgA transmitted in a random access procedure.

Referring to FIG. 4, a MsgA transmitted in a random access procedure may include a random access preamble 410 and a payload 420. Here, the random access preamble 410 may include a superposed preamble, and the payload 420 may include a data packet. As such, the MsgA may include the payload 420 in addition to the random access preamble 410, so that the terminal can transmit data to the base station in the random access procedure.

Figure 5:
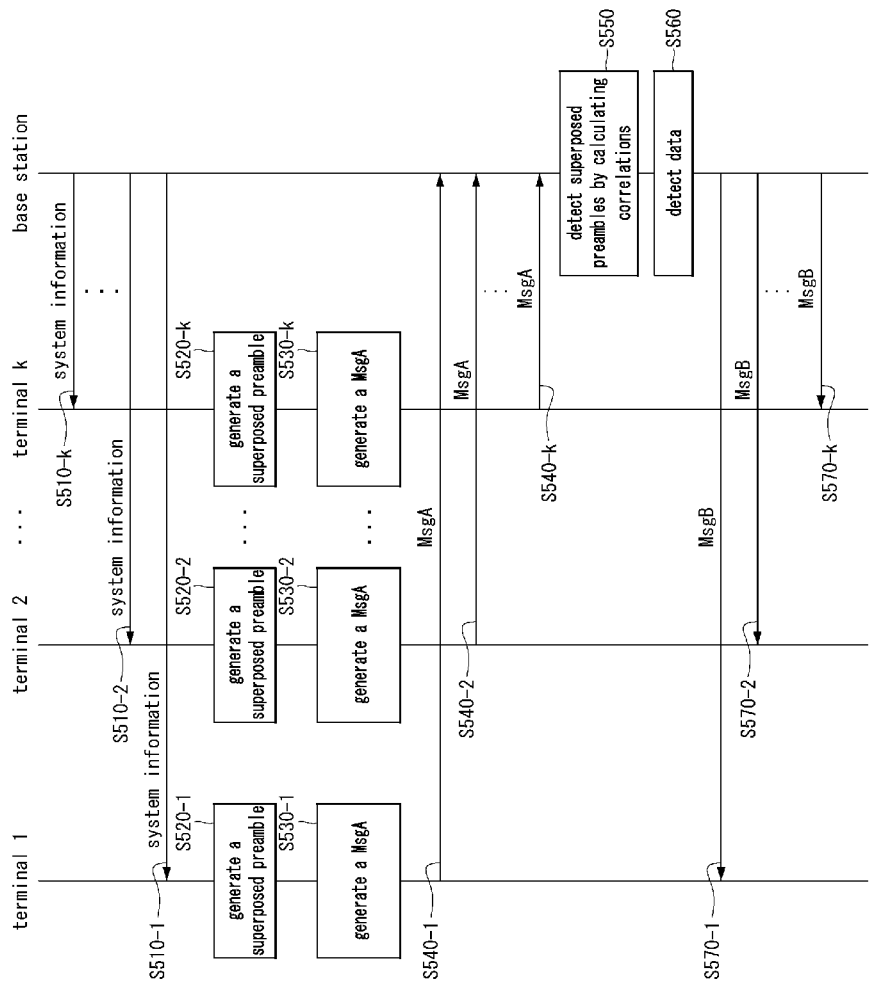
FIG. 5 is a sequence chart illustrating a first exemplary embodiment of a random access method using a superposed preamble.

FIG. 5 is a sequence chart illustrating a first exemplary embodiment of a random access method using a superposed preamble.

Referring to FIG. 5, in order to communicate with a mobile communication network through a base station in a random access method using a superposed preamble, each of terminals may first perform a cell search procedure, acquire synchronization with a neighbor base station, and then receive system information transmitted from the corresponding base station (S510-1 to S510-$k$). Here, the system information received by the terminals from the base station may include basis preamble information and linear combination information. In addition, the system information received by the terminals from the base station may include at least one among repetition level information, power ramping parameter information, maximum preamble transmission count information, RA response window size (random access (RA)-response window size) information, and contention resolution timer information.

Thereafter, each terminal may generate a basis preamble matrix by using basis preambles indicated by the basis preamble information, and apply one linear combination among linear combinations indicated by the linear combination information to the generated basis preamble matrix to obtain the superposed preamble (S520-1 to S520-$k$). Looking at this in more detail with reference to FIG. 6, it may be as follows.

Figure 6:
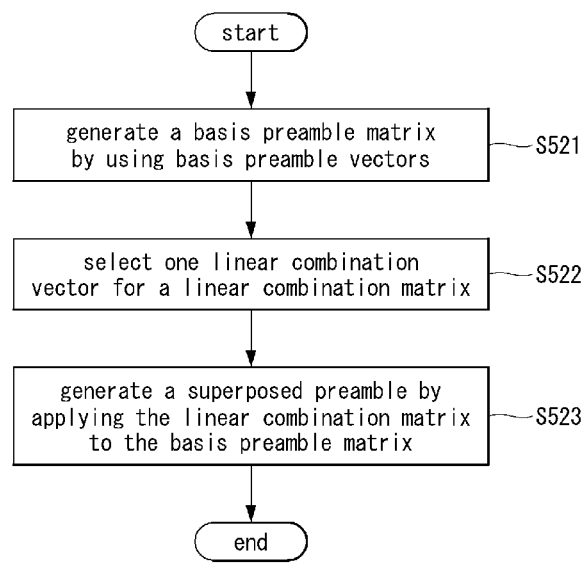
FIG. 6 is a flowchart illustrating a first exemplary embodiment of the procedure of generating the superposed preamble in FIG. 5.

FIG. 6 is a flowchart illustrating a first exemplary embodiment of the procedure of generating the superposed preamble in FIG. 5.

Referring to FIG. 6, in the procedure of generating the superposed preamble, each terminal may generate a basis preamble matrix C by using L basis preamble vectors indicated by the basis preamble information of the system information (S521). Here, the basis preamble vector may be a preamble sequence. When the basis preamble vector C may be expressed as $C=[c_1 \ldots c_L]\in \mathbb{C}^{N\times L}$ when each basis preamble vector is $c_i$. Here, $1\le i\le L$. Here, $\mathbb{C}$ may have a form of a complex number. Then, each terminal may randomly select one linear combination vector $\phi_{q(k)}$ from a linear combination matrix $\Phi$ consisting of linear combination vectors indicated by the linear combination information (S522). Here, $\phi_i$ may mean a linear combination vector, for example, it may mean a column vector of the linear combination matrix $\Phi$ expressed as in Equation 1 below.

TABLE 1

$$\Phi = \begin{bmatrix} 1 & 1 & 1 & 0 & 0 & 0 \\ 1 & 0 & 0 & 1 & 1 & 0 \\ 0 & 1 & 0 & 1 & 0 & 1 \\ 0 & 0 & 1 & 0 & 1 & 1 \end{bmatrix}$$

Meanwhile, when an arbitrary terminal among several terminals to access the base station is referred to as a k-th terminal, q(k) may be an identifier for identifying a linear combination vector for the k-th terminal, and it may be defined as $1 \leq q(k) \leq Q$. In this case, k may be defined as $1 \leq k \leq K$. Accordingly, the linear combination vector may be defined as $\phi_i$, i may be defined as $1 \leq i \leq Q$, and $\Phi$ may be expressed as $\Phi = [\phi_1 \ldots \phi_Q] \in \mathbb{C}^{L \times Q}$. Here, Q may be a natural number. As such, when the basis preamble matrix and the linear combination vector for each terminal are determined, each terminal may generate each superposed preamble $C\phi_{q(k)}$ by applying the linear combination vector corresponding to each terminal to the basis preamble matrix (S523).

For example, assuming that the basis preamble matrix is $C = [c_1, c_2, c_3, c_4]$, the first terminal may select a first column vector from the linear combination matrix of Equation 1 as its linear combination vector to generate a superposed preamble consisting of $c_1 + c_2$, the second terminal may select a second column vector from the linear combination matrix of Equation 1 as its linear combination vector to generate a superposed preamble consisting of $c_1 + c_3$, and the third terminal may select a third column vector from the linear combination matrix of Equation 1 as its linear combination vector to generate a superposed preamble consisting of $c_1 + c_4$. The fourth terminal may select a fourth column vector from the linear combination matrix of Equation 1 as its linear combination vector to generate a superposed preamble consisting of $c_2 + c_3$, the fifth terminal may select a fifth column vector from the linear combination matrix of Equation 1 as its linear combination vector to generate a superposed preamble consisting of $c_2 + c_4$, and the sixth terminal may select a sixth column vector from the linear combination matrix of Equation 1 as its linear combination vector to generate a superposed preamble consisting of $c_3 + c_4$.

Referring again to FIG. 5, each terminal may generate a MsgA, which is a random access preamble message including the generated superposed preamble and a data packet (S530-1 to S530-k), and transmit it to the base station (S540-1 to S540-k). Such the random access preamble messages may include the superposed preambles as the random access preambles, and may include data packets as the payloads. In such the random access preamble messages, the superposed preambles may be transmitted to the base station by applying transmit powers $P_k$ of the terminals, and they may be transmitted from the terminals as superposed preamble transmission signals $x_k$ as shown in Equation 2 below.

$$x_k = \sqrt{P_k} C \phi_{(k)} \in \mathbb{C}^N \quad \text{[Equation 2]}$$

Accordingly, the base station may receive the random access preamble messages. Then, the base station may detect the superposed preambles by calculating correlations of the basis preambles with respect to the received random access preamble messages (S550).

Figure 7:
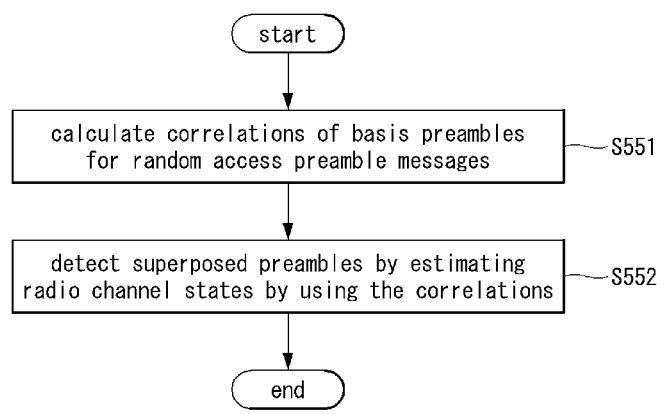
FIG. 7 is a flowchart illustrating a first exemplary embodiment of a procedure of detecting superposed preambles by calculating correlations in FIG. 5.

FIG. 7 is a flowchart illustrating a first exemplary embodiment of a procedure of detecting superposed preambles by calculating correlations in FIG. 5.

Referring to FIG. 7, in the procedure of calculating the correlations and detecting the superposed preambles, the base station may calculate the correlations of the basis preambles with respect to the received random access preamble messages (S551). Looking at this in more detail, the superposed preamble transmission signals $x_k$ of the random access preamble messages transmitted by terminals may reach the base station through radio channels $h_k \in \mathbb{C}^M$ ($1 \leq k \leq K$). Accordingly, the base station may receive the superposed preamble transmission signals transmitted from the terminals through the radio channels. In this case, if superposed preamble reception signals received by the base station are expressed in a matrix, a superposed preamble reception signal matrix Y may expressed as in Equation 3 below.

$$Y = \sum_{k=1}^{K} h_k x_k^T + N \in \mathbb{C}^{M \times N} \quad \text{[Equation 3]}$$

Here, N may mean a white noise matrix. Accordingly, the base station may calculate the correlations $YC^*$ of the basis preambles with respect to the random access preamble messages by multiplying the superposed preamble reception signal matrix by the basis preamble matrix. Meanwhile, the base station may detect the superposed preambles by estimating the states of the radio channels by using the correlations (S552).

Figure 8:
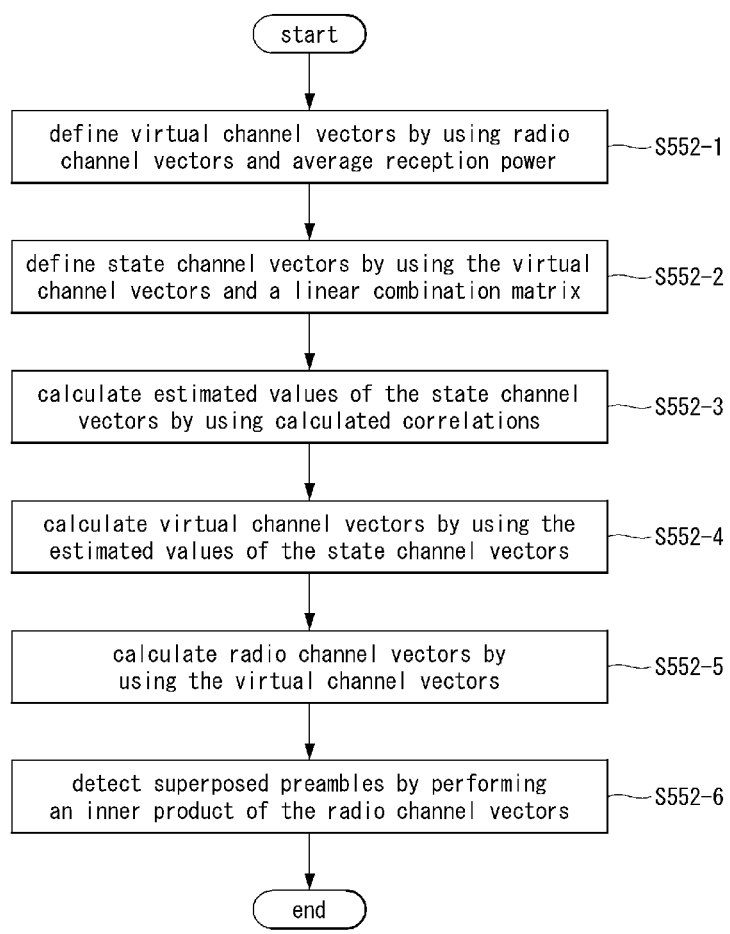
FIG. 8 is a flowchart illustrating a first exemplary embodiment of the procedure of detecting the superposed preambles using the radio channel states in FIG. 7.

FIG. 8 is a flowchart illustrating a first exemplary embodiment of the procedure of detecting the superposed preambles using the radio channel states in FIG. 7.

Referring to FIG. 8, in the procedure of detecting the superposed preambles using the radio channel states, the base station may define virtual channel vectors using the radio channel vectors and an average reception power (S552-1).

Looking at this in more detail, the base station may express the superposed preamble reception signal matrix as in Equation 4 by substituting Equation 2 into Equation 3 below.

$$\begin{aligned} Y &= [h_1 \ldots h_K] \begin{bmatrix} \sqrt{P_1} \phi_{q(1)}^T \\ \vdots \\ \sqrt{P_K} \phi_{q(K)}^T \end{bmatrix} C^T + N \\ &= \sqrt{P_{rx}} [v_1 \ldots v_K] \begin{bmatrix} \phi_{q(1)}^T \\ \vdots \\ \phi_{q(K)}^T \end{bmatrix} C^T + N \\ &= \sqrt{P_{rx}} [a_1 \ldots a_Q] \Phi^T C^T + N \end{aligned} \quad \text{[Equation 4]}$$

Here, the base station may assume that power control is performed so that the reception power of the superposed preamble reception signal received from each terminal is uniform to an average reception power $P_{rx}$. Accordingly, the radio channel vector $v_k$ for which the power control is uniformly performed based on the average reception power may be defined as $\sqrt{P_k} h_k = \sqrt{P_{rx}} v_k$ by using the radio channel vector $h_k$. In this case, a variance of the radio channel vector $v_k$ for which the power control is uniformly performed based on the average reception power may be a constant for k. Here, the base station may define virtual channel vectors $a_q$ by using the radio channel vectors for which power control is uniformly performed based on the average reception power and the average reception power (S552-1). Here, q may be defined as $1 \leq q \leq Q$. That is, the virtual channel vector $a_q$ may be calculated using the radio channel vector $v_k$ for which power control is uniformly performed based on the average reception power as in Equation 5 by using a unit vector $e_{q(k)}^{(Q)}$. Here, $e_i^{(Q)} \in \mathbb{C}^Q$ may represent a unit vector in which the i-th element may be 1 and all remaining elements may be 0.

$$[a_1 \ \ldots \ a_Q] = [v_1 \ \ldots \ v_K][e_{q(1)}^{(Q)} \ \ldots \ e_{q(K)}^{(Q)}]^T \quad \text{[Equation 5]}$$

As a result, a basis preamble vector simultaneously selected by several terminals may correspond to a sum of virtual channel vectors of the corresponding terminals, and a basis preamble vector not selected by any terminal may correspond to a zero vector. Therefore, in order for the base station to detect the superposed preambles, it may be necessary to determine a nonzero virtual channel vector $a_q$. Meanwhile, the base station may define state channel vectors by using the virtual channel vectors and the linear combination matrix (S522-2). Looking at this in more detail, the base station may express correlations YC* calculated for the basis preambles by multiplying the superposed preamble reception signal matrix by the basis preamble matrix as in Equation 6.

$$YC^* = \sqrt{P_{rx}}[g_1 \ \ldots \ g_L](C^H C)^* + NC^* \in \mathbb{C}^{M \times L}$$

$$[g_1 \ \ldots \ g_L] = [a_1 \ \ldots \ a_Q]\Phi^T \in \mathbb{C}^{M \times L} \quad \text{[Equation 6]}$$

In addition, the base station may define the state channel vectors $g_l$ by using the virtual channel vectors $a_q$ and a transpose matrix $\Phi^T$ of the linear combination matrix $\Phi$. Here, the state channel vectors $g_l$ may be values reflecting the channel state experienced by the l-th basis preamble among the L basis preambles. The base station may calculate estimated values $\hat{g}_l$ of the state channel vectors $g_l$ by applying a least square estimator to the calculated correlations, and they may be expressed as in Equation 7 below (S522-3).

$$[\hat{g}_1 \ \ldots \ \hat{g}_L] = \frac{1}{\sqrt{P_{rx}}} YC^* \begin{bmatrix} (c_1^H c_1)^{-1} & & \\ & \ddots & \\ & & (c_L^H c_L)^{-1} \end{bmatrix} \quad \text{[Equation 7]}$$

$$= [g_1 \ \ldots \ g_L] + [w_1 \ \ldots \ w_L]$$

Here, the estimation error $w_l$ may converge to 0 as off-diagonal elements of $C^H C$ become smaller and the average reception power $\sqrt{P_{rx}}$ increases. The base station may calculate the virtual channel vectors $a_q$ based on the estimated values $\hat{g}_l$ of the state channel vectors $g_l$ (S522-4). Since the virtual channel vectors $a_q$ may be multiplied with $\phi_q^T$ in Equation 6 and only non-zero elements $\phi_{l,q}$ in $\phi_q$ affect $g_l$, the base station may calculate sufficient statistics for detecting the superposed preambles may be given as $\{\hat{g}_l | \phi_{l,q} \neq 0, 1 \leq l \leq L\}$. In particular, the linear combination matrix $\Phi$ may be configured as a binary column vector matrix having a weight of 2, and thus $Q = \frac{1}{2} L(L-1)$ may be defined. The base station may determine that the positions of nonzero elements of the linear combination vector $\phi_q$ are given by $\eta(1, q)$ and $\eta(2, q)$, and may determine that $a_q$ is detected when $|\hat{g}_{\eta(1,q)}^H \hat{g}_{\eta(2,q)}|$ is sufficiently large. The base station may calculate the radio channel vectors by estimating radio channel states using the virtual channel vectors (S522-5).

Then, the superposed preambles may be detected by performing an inner product of the calculated radio channel vectors (S522-6). In this case, the base station may improve the detection reliability as the number M of the receive antennas increases. For example, in the case of L=4, the linear combination matrix $\Phi$ may be given as Equation 1, and whether $a_3$ is detected may be determined using $|\hat{g}_1^H \hat{g}_4|$. Accordingly, the probability of occurrence of collision free (CF) may increase due to the increase in the number of preambles.

Figure 9:
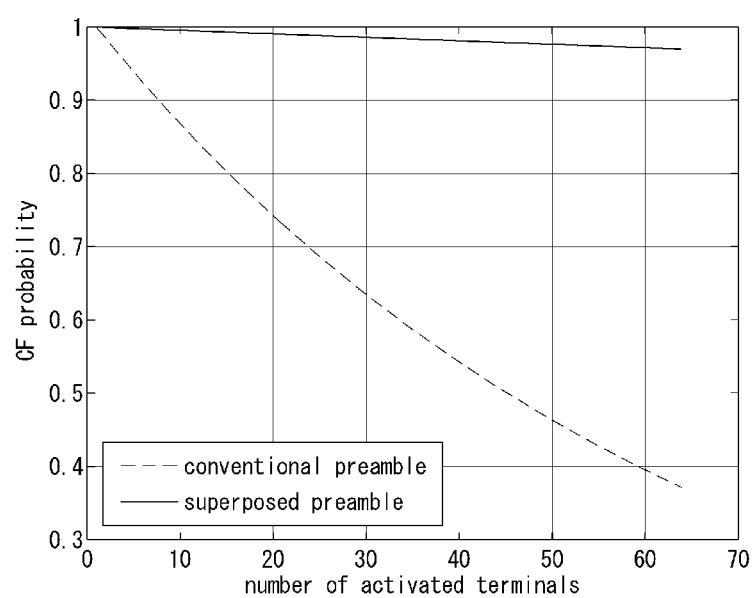
FIG. 9 is a graph illustrating an occurrence probability of collision free (CF) for an activated terminal.

FIG. 9 is a graph illustrating an occurrence probability of collision free (CF) for an activated terminal.

Referring to FIG. 9, as the number of activated terminals increases, an occurrence probability of collision free (CF) for an activated terminal gradually decreases when the conventional preambles are used, and thus many collisions may be expected. However, when the superposed preambles are used, an occurrence probability of CF for an activated terminal hardly changes, so it may be expected that there is little possibility of collision. Here, L may be assumed to be 64.

Meanwhile, the base station may construct a submatrix as shown in Equation 8 below by using the virtual channel vectors $a_q$ and the linear combination vectors $\phi_q$ corresponding to the detected superposed preambles.

$$[\hat{g}_1 \ \ldots \ \hat{g}_L] = [\bar{a}_1 \ \ldots \ \bar{a}_{\bar{K}}] \begin{bmatrix} \bar{\phi}_1^T \\ \vdots \\ \bar{\phi}_{\bar{K}}^T \end{bmatrix} + [w_1 \ \ldots \ w_L] \quad \text{[Equation 8]}$$

Here, $\bar{K} \leq K$ may be defined, and Equation 8 may be established when all terminals select different superposed preambles. Equation 9 below may be established by a property of Kronecker product $\otimes$.

$$\begin{bmatrix} \hat{g}_1 \\ \vdots \\ \hat{g}_L \end{bmatrix} = ([\bar{\phi}_1 \ \ldots \ \bar{\phi}_{\bar{K}}] \otimes I_M) \begin{bmatrix} \bar{a}_1 \\ \vdots \\ \bar{a}_{\bar{K}} \end{bmatrix} + \begin{bmatrix} w_1 \\ \vdots \\ w_L \end{bmatrix} \quad \text{[Equation 9]}$$

The virtual channel vector corresponding to the superposed preambles detected from Equation 9 may be estimated as shown in Equation 10.

$$\begin{bmatrix} \bar{a}_1 \\ \vdots \\ \bar{a}_{\bar{Q}} \end{bmatrix} = ([\bar{\phi}_1 \ \ldots \ \bar{\phi}_{\bar{K}}]^\dagger \otimes I_M) \begin{bmatrix} \hat{g}_1 \\ \vdots \\ \hat{g}_L \end{bmatrix} \quad \text{[Equation 10]}$$

Here, † may mean a Moor-Penrose pseudo-inverse, and if a rank of the corresponding matrix is smaller than $\bar{K}$, a solution may not exist, but a solution may be obtained with a high probability.

Figure 10:
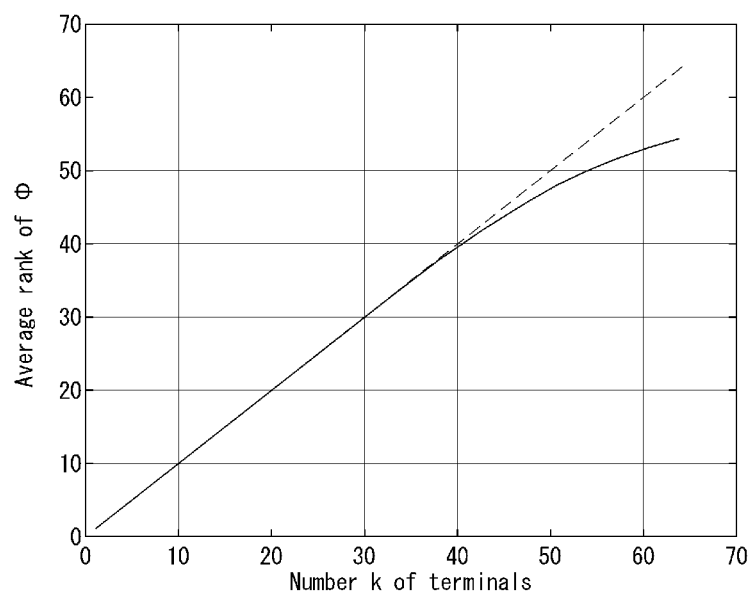
FIG. 10 is a graph illustrating an average rank according to the number of terminals.

FIG. 10 is a graph illustrating an average rank according to the number of terminals.

Referring to FIG. 10, in the graph representing the average rank according to the number of terminals, a solid line may indicate the number of matrices of the average rank, and a dotted line may indicate an average rank expressed as a function of K when K=L=64. It can be seen that the average rank increases as the number of terminals increases. Referring again to FIG. 6, the base station may detect data packets from the random access preamble messages as shown in Equation 11 below by using the virtual channel vectors corresponding to the detected superposed preambles (S560).

$$Z = \sum_{k=1}^{K} h_k \sqrt{P_k}\, b_k^T + \tilde{N} = \sqrt{P_{rx}}\, [v_1 \ \ldots\ v_K] \begin{bmatrix} b_1^T \\ \vdots \\ b_K^T \end{bmatrix} + \tilde{N} =$$

$$\sqrt{P_{rx}}\, [\bar{a}_1 \ \ldots\ \bar{a}_{\bar{Q}}] \begin{bmatrix} \bar{b}_1^T \\ \vdots \\ \bar{b}_{\bar{Q}}^T \end{bmatrix} + \tilde{N}$$

[Equation 11]

Here, $b_k$ may be a data packet of the k-th terminal. Here, $\bar{b}_i$ may be defined as $\bar{b}_i = b_p$, and p may be the i-th greatest element in a set $\{q(k) | 1 \leq k < K\}$. Also, $\tilde{N}$ may be a white noise.

Meanwhile, when the base station detects the superposed preambles, it may generate a random access response message MsgB and transmit it to the terminals (S570-1 to S570-k). Here, the random access response message may be a MsgB in case of a two-step random access procedure, and may be a Msg2 in case of a four-step random access procedure. In this case, terminals performing random access may use different superposed preambles, and in this case, even when the same resource is used, a collision does not occur. Also, it can be known from downlink signaling which terminal is related to the corresponding response. However, multiple terminals may use the same superposed preamble at the same time, and in this case, the multiple terminals may respond to the same random access response message and a collision may occur. In order to resolve such the collision, the base station and the terminals may perform a contention resolution procedure.

Meanwhile, when the terminals transmit the superposed preamble signal through filtering such as the OFDM, DFT-S-OFDM, FBMC, or the like, a peak-to-average power ratio (PAPR) of a signal transmitted by each terminal may vary. For example, a Zadoff-chu sequence may have a PAPR of 0 dB because the size of each term thereof is constant, but when a Zadoff-chu sequence goes through the DFT-S-OFDM, several terms are added and transmitted. Therefore, the PAPR may be greater than 0 dB. In this case, the base station may also be able to reduce the PAPR by adjusting the linear combination matrix $\Phi$. For example, if the base station restricts the number of nonzero elements in each column vector of the linear combination matrix to 2, the terminals may take the nonzero elements from among constant amplitude complex numbers. For example, the base station may fill the linear combination matrix $\Phi$ with a combination instead of $\{1\}$, that minimizes the PAPR by considering Equation 12 below as alphabets.

$$\left\{ \exp\left(j\pi \frac{n}{4}\right) \,\middle|\, 0 \leq n < 8 \right\}$$

[Equation 12]

Meanwhile, the terminals may generate and transmit the superposed preambles, and the base station may detect the superposed preambles by calculating correlation from a received signal. In this case, the number of preambles may increase from L to Q, due to the introduction of the linear combination matrix $\Phi$. As described above, although the number of preambles is increased, the base station can detect the superposed preambles by performing correlation calculation L times, so that there may be a gain in terms of reception complexity. In particular, when the number of non-zero elements is restricted to two in the respective row vectors of the linear combination matrix $\Phi$, it may be sufficient to additionally calculate only an inner product of a correlation vector pair corresponding to the non-zero elements. Here, a vector having a sufficiently small norm among the L correlation vectors may be regarded as 0, and the amount of computation may be further reduced by excluding it from possible vector pairs.

Meanwhile, there may be a problem in that the PAPR of the signal increases in the process of superposing preambles. By controlling a phase of the non-zero element of the linear combination matrix $\Phi$, the increase in the PAPR may be restricted.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
   receiving, from a base station, basis preamble information and linear combination information;
   generating a superposed preamble by using the basis preamble information and the linear combination information;
   transmitting, to the base station, a first message including the generated superposed preamble; and
   receiving, from the base station, a second message that is a response signal for the first message,
   wherein the superposed preamble is generated as a linear combination of basis preambles indicated by the basis preamble information.

2. The operation method according to claim 1, wherein the generating of the superposed preamble comprises:
   generating a basis preamble matrix by using the basis preambles indicated by the basis preamble information;
   selecting one linear combination from linear combinations indicated by the linear combination information; and
   generating the superposed preamble by applying the selected linear combination to the basis preamble matrix.

3. The operation method according to claim 2, wherein the generating of the superposed preamble by applying the selected linear combination to the basis preamble matrix comprises:
   selecting one row vector from the basis preamble matrix; and
   generating the superposed preamble by multiplying the selected one row vector by the selected linear combination.

4. The operation method according to claim 1, wherein the superposed preamble is calculated by an inner product of correlation vectors of a linear combination matrix composed of linear combinations indicated by the linear combination information.

5. The operation method according to claim 1, wherein the first message further includes a data packet, and in the transmitting of the first message, the terminal transmits the first message including the superposed preamble and the data packet to the base station.

6. The operation method according to claim 1, wherein the first message is a MsgA, and the second message is a MsgB.

7. An operation method of a base station in a communication system, the operation method comprising:
   transmitting, to terminals, basis preamble information and linear combination information;
   receiving, from the terminals, first messages including superposed preambles generated using the basis preamble information and the linear combination information;
   detecting the superposed preambles by calculating correlations between the first messages and basis preambles indicated by the basis preamble information; and
   transmitting, to the terminals, second messages that are response signals for the first messages,
   wherein the detecting of the superposed preambles comprises:
   calculating the correlations between the first messages and the basis preambles; and
   detecting the superposed preambles by estimating first radio channel states by using the correlations.

8. The operation method according to claim 7, wherein the superposed preamble is configured as a linear combination of at least one basis preamble indicated by the basis preamble information, the linear combination being one of linear combinations indicated by the linear combination information.

9. The operation method according to claim 7, wherein in the calculating of the correlations between the first messages and the basis preambles, the correlations between the first messages and the basis preambles are calculated by multiplying a basis preamble matrix composed of the basis preambles indicated by the basis preamble information to a reception signal matrix of the first messages.

10. The operation method according to claim 7, wherein the detecting of the superposed preambles by estimating first radio channel states by using the correlations comprises:
   defining virtual channel vectors by using radio channel vectors and average reception power;
   defining state channel vectors by using the virtual channel vectors and a linear combination matrix;
   calculating estimated values of the state channel vectors by using the correlations;
   calculating the virtual channel vectors by using the estimated values of the state channel vectors;
   calculating first radio channel vectors by estimating first radio channel states using the virtual channel vectors; and
   detecting the superposed preambles by performing an inner product of the first radio channel vectors.

11. The operation method according to claim 7, further comprising:
   estimating second radio channel states corresponding to the detected superposed preambles; and
   detecting a data packet in each of the first messages by using the estimated second radio channel states, wherein each of the first message includes a data packet.

12. A terminal in a communication system, the terminal comprising:
   a processor;
   a memory electronically communicating with the processor; and
   instructions stored in the memory,
   wherein when executed by the processor, the instructions cause the terminal to:
   receive, from a base station, basis preamble information and linear combination information;
   generate a superposed preamble by using the basis preamble information and the linear combination information;
   transmit, to the base station, a first message including the generated superposed preamble; and
   receive, from the base station, a second message that is a response signal for the first message,
   wherein the superposed preamble is generated as a linear combination of basis preambles indicated by the basis preamble information.

13. The terminal according to claim 12, wherein in the generating of the superposed preamble, the instructions further cause the terminal to:
   generate a basis preamble matrix by using the basis preambles indicated by the basis preamble information;
   select one linear combination from linear combinations indicated by the linear combination information; and
   generate the superposed preamble by applying the selected linear combination to the basis preamble matrix.

14. The terminal according to claim 13, wherein in the generating of the superposed preamble by applying the selected linear combination to the basis preamble matrix, the instructions further cause the terminal to:
   select one row vector from the basis preamble matrix; and
   generate the superposed preamble by multiplying the selected one row vector by the selected linear combination.

15. The terminal according to claim 12, wherein the superposed preamble is calculated by an inner product of correlation vectors of a linear combination matrix composed of linear combinations indicated by the linear combination information.

16. The terminal according to claim 12, wherein the first message further includes a data packet, and in the transmitting of the first message, the instructions further cause the terminal to transmit the first message including the superposed preamble and the data packet to the base station.

\* \* \* \* \*